United States Patent
Ikehata et al.

(10) Patent No.: US 7,593,012 B2
(45) Date of Patent: Sep. 22, 2009

(54) GRAPHICS IMAGE GENERATION METHOD, PROGRAM AND STATISTICAL DATA DRAWING APPARATUS

(75) Inventors: Yuko Ikehata, Yokohama (JP); Takayuki Itoh, Yokohama (JP); Yasumasa Kajinaga, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 1239 days.

(21) Appl. No.: 10/369,876

(22) Filed: Feb. 19, 2003

(65) Prior Publication Data
US 2003/0158846 A1    Aug. 21, 2003

(30) Foreign Application Priority Data
Feb. 20, 2002    (JP)    ............................. 2002-043161

(51) Int. Cl.
G06T 11/20    (2006.01)
G09G 5/00    (2006.01)
G06F 3/048    (2006.01)

(52) U.S. Cl. ...................... 345/440; 345/619; 715/788; 715/799; 715/800

(58) Field of Classification Search ................ 345/440, 345/619; 715/700, 788, 799
See application file for complete search history.

(56) References Cited

U.S. PATENT DOCUMENTS 5,430,831 A * 7/1995 Snellen ........................ 345/619
5,581,797 A * 12/1996 Baker et al. .................. 345/440
7,027,052 B1 * 4/2006 Thorn et al. ................. 345/440
2008/0088628 A1 * 4/2008 Lu et al. ...................... 345/440

OTHER PUBLICATIONS

Bederson, B., et al., "Ordered and Quantum Treemaps: Making Effective Use of 2D Space to Display Hierarchies", 2002, p. 833-854.*
Bruls, M., et al., "Squarified Treemaps", pp. 1-10.*

* cited by examiner

Primary Examiner—Chante Harrison
(74) Attorney, Agent, or Firm—Scully, Scott, Murphy & Presser, P.C.; Kenneth R. Corsello, Esq.

(57) ABSTRACT

In a method of visualizing statistical data, to constantly provide drawing with excellent visibility by arranging rectangles corresponding to individual data in an order corresponding to section values of classes, and displaying a desired rectangle in a near square shape. With respect to the statistical data to be processed, a plurality of strip regions are formed in a region corresponding to an entire statistical data, and rectangles for representing individual data of the statistical data are arranged in the above described strip regions to generate image data of the region corresponding to the entire statistical data. With respect to sequences of the rectangles in the image data, the rectangles are rearranged in each of the strip regions such that the rectangles corresponding to the individual data adjacent to each other in the statistical data are also adjacent to each other in the image, and the image data is updated.

6 Claims, 13 Drawing Sheets

GRAPHICS IMAGE GENERATION METHOD, PROGRAM AND STATISTICAL DATA DRAWING APPARATUS

FIELD OF THE INVENTION

The present invention is directed to image generation and data drawing. It is more particularly directed to visualizing a number distribution of statistical data in a representation method of region segmentation type.

BACKGROUND

For a typical method of visualizing statistical data, there is a representation method of region segmentation type such as a column chart or a pie graph. It is a method of visualizing contents of the statistical data by classifying the statistical data to represent them with class values meaning the contents of the data and section values meaning an order of the data, and segmenting a drawing such as a rectangle (in the case of the column chart) or a circle (in the case of the pie graph) into small regions of sizes corresponding to the class values.

When the statistical data is classified, there is the case where the number of classes becomes very large or the case where the class values become very small. When these cases are represented in a simple band or pie graph, in which the respective small regions are only lined up in a sequence, the small regions corresponding to the small class values are collapsed thinly so as to become difficult to read. In addition, if the number of the classes is large, many borders of the respective small regions are arranged at small intervals so that the graph becomes difficult to read.

FIG. 12 shows an example of the column chart. Referring to FIG. 12, parts having the small class values are collapsed thinly to become difficult to read.

For a solution for solving such problems, a visualization method is known of representing the class values of the statistical data by two-dimensional region segmentation. A typical one such method is Treemap method. FIG. 13 shows examples of drawing in the Treemap method in which FIG. 13(A) is an example of drawing the statistical data including two hierarchies, and FIG. 13(B) is an example of drawing the statistical data including three hierarchies.

In the Treemap method, the hierarchies are represented in the region segmentation such as a nested column chart by a repeat process, such that first a rectangular region forming the graph is segmented vertically, next the respective regions are segmented horizontally (see FIG. 13(A)), and if necessary, the respective regions are further segmented vertically (see FIG. 13(B)). The Treemap method is described in detail in: Johnson B., et al., Tree-Maps: A Space Filling Approach to the Visualization of Hierarchical Information Space, IEEE Visualization '91, pp. 275-282, 1991.

Furthermore, based on the Treemap method, there are representation methods such as the Squarified Treemap method or the Clustered Treemap method, in which two-dimensional region segmentation is performed with respect to the statistical data without a hierarchical structure, and the rectangular region is segmented into a group of rectangles having areas proportional to the class values. FIG. 14 shows an example of a drawing in the Squarified Treemap method, and FIG. 15 shows an example of a drawing in the Clustered Treemap method.

In these methods, the classified statistical data are sorted based on the class values, and the rectangles having the sizes corresponding to the respective class values (small regions), are arranged within the rectangular region corresponding to the entire statistical data in a descending order of the class values. In addition, the entire rectangular region is segmented into the group of the rectangles in shapes as near square as possible (that is, differences between longer sides and shorter sides of the rectangles are as small as possible). These methods, in which the rectangles corresponding to the class values are represented in the near square shapes, are characterized in that:

the rectangles corresponding to the small class values are prevented from being collapsed to become invisible; and
the sizes of the rectangles (class values) are easy to compare because the shapes of the rectangles are nearly similar.

In addition, in the Ordered Treemap method developed similarly based on the Treemap method, the rectangles corresponding to the class values are arranged in an order of the section values such that the rectangles become near square shapes. FIG. 16 shows an example of drawing in the Ordered Treemap method. This method is characterized in that adjacent class values are easy to compare visually because positional relation of the rectangles is the order of the section values of the classes.

As described above, though some methods have been proposed as methods of visualizing classified statistical data, there have been drawbacks as follows in these methods. In the Squarified Treemap method or the Clustered Treemap method, rectangles corresponding to class values are arranged based on sizes of the class values so that positional relation of the arranged rectangles becomes independent of section values. Therefore, it has been difficult to visually compare the data adjacent in the section values.

In addition, in the Ordered Treemap method, the rectangles corresponding to the class values are arranged in an order of the section values, so that it is easier than the above described two methods to visually compare the data adjacent in the section values. However, since it has not been considered to arrange the adjacent section values to be adjacent to each other on a screen, the rectangles corresponding to the data having the adjacent section values are arranged at separate positions on the screen, thereby easiness of the data comparison may be degraded.

Furthermore, in the Ordered Treemap method, since arranging the rectangles in the order of the section values is prioritized, shapes of the rectangles often do not become near square (that is, differences between longer sides and shorter sides of the rectangles often do not become small), in comparison with the above described two methods of prioritizing the sizes of the class values, thereby the comparison in the class values may be difficult.

Also the Treemap method, in which, with respect to the statistical data having a hierarchical structure, a nested column chart is configured with the above described hierarchical structure reflected therein, has had drawbacks that a simple column chart is configured if the statistical data without the hierarchical structure is visualized, that the rectangles corresponding to the data having the adjacent section values are arranged at the separate positions on the screen, thereby the easiness of the data comparison may be degraded similarly as the Ordered Treemap method, that an operation for shaping the arranged rectangles to be near squares is not performed, thereby the comparison in the class values may be difficult, and the like.

SUMMARY OF THE INVENTION

Therefore, it is an aspect of the present invention to provide in a method of visualizing statistical data, to constantly provide drawing with excellent visibility by arranging the rectangles corresponding to individual data in the order corresponding to the section values of the classes, and displaying a rectangle corresponding to a desired class value in a near square shape.

It is another aspect of the present invention to draw the data for the easy visual comparison by arranging the rectangles corresponding to the data adjacent in the section values necessarily in adjacent positional relation.

These aspects are achieved as a graphics image generation method of controlling a computer to generate a graphics image for visualizing statistical data. That is, the graphics image generation method inputs the statistical data to be processed, forms a plurality of strip regions in a region corresponding to the entire statistical data, and arranges rectangles for representing individual data of the statistical data in the above described strip regions to generate image data of the region corresponding to the entire statistical data.

In addition, another graphics image generation method according to the present invention is characterized by including the steps of: inputting statistical data to be processed, arranging rectangles for representing individual data of the statistical data in a region corresponding to the entire statistical data, according to a line-up order of the statistical data, to generate the graphics image; rearranging shapes and the arrangements of the respective rectangles such that an aspect ratio of a predetermined rectangle among the arranged rectangles approximates to one (1) and sequences of the rectangles line up as strips; and with respect to the sequences of the rectangles in the rearranged image, making the respective rectangles contiguous in the order according to the above described statistical data by inverting a line-up order of the rectangles in each sequence.

In addition, the present invention for attaining the above described aspects is also realized as a statistical data drawing apparatus configured as will be described below, for controlling a computer to generate and draw a graphics image for visualizing statistical data.

In addition, another statistical data drawing apparatus according to the present invention is characterized by including: a class arranging section for arranging rectangles for representing individual data of the statistical data in a predetermined order, order according to the above described, in a region corresponding to the entire; a rearrangement processing section for rearranging the arrangements and shapes of the rectangles respect to a plurality of rectangles adjacent to each other, Furthermore, the present invention may be realized as a program for making a computer execute the processes corresponding to the respective steps of the above described graphics image generation methods, or controlling the computer to function as the above described statistical data drawing apparatus. This program may be provided by storing them in a magnetic disk, an optical disk, a semiconductor memory, or other storage media and distributing them, or delivering them via a network.

BRIEF DESCRIPTION OF THE DRAWINGS

These and other aspects, features, and advantages of the present invention will become apparent upon further consideration of the following detailed description of the invention when read in conjunction with the drawing figures, in which.

DESCRIPTION OF SYMBOLS

Figure 1:
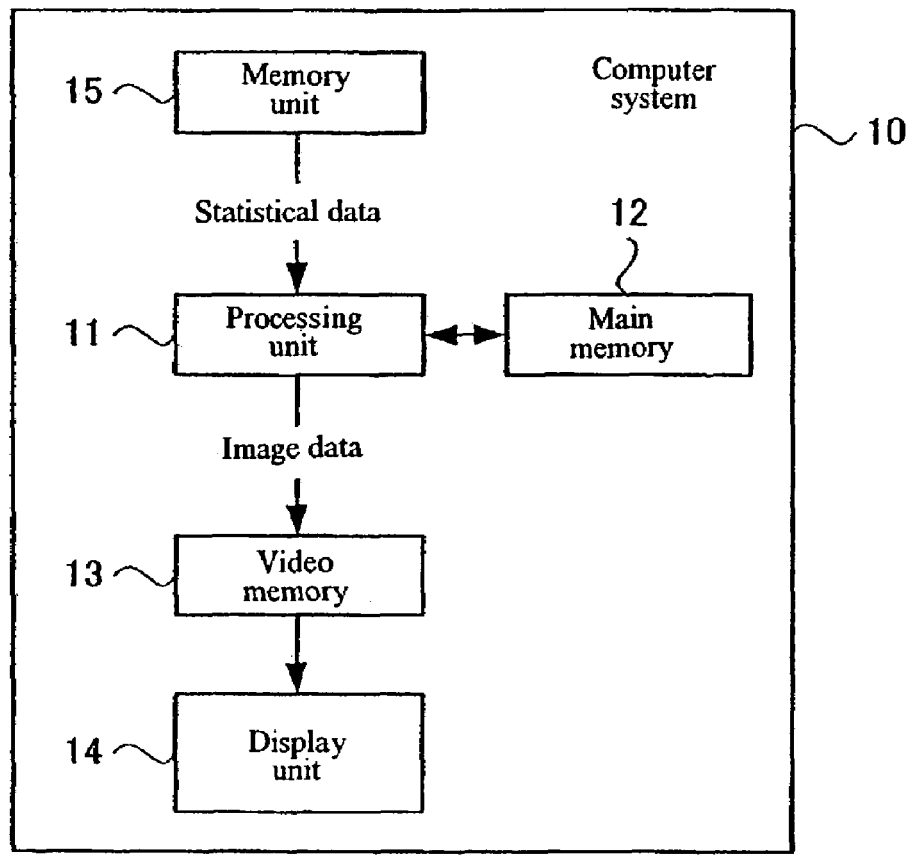
FIG. 1 shows a configuration of a computer system as a graphics image generation apparatus for drawing statistical data according to the present embodiment.

10 . . . Computer system
11 . . . Processing unit (CPU and Video chip)
12 . . . Main memory
13 . . . Video memory
14 . . . Display unit
15 . . . Memory unit
21 . . . Class arranging section
22 . . . Rearrangement processing section
23 . . . Turn back processing section

DESCRIPTION OF THE INVENTION

The present invention, includes a method of visualizing statistical data. It provides methods, apparatus and systems for drawing with excellent visibility by arranging the rectangles corresponding to individual data in the order corresponding to the section values of the classes, and displaying a rectangle corresponding to a desired class value in a near square shape. The present invention also provides methods, apparatus and systems to draw the data for the easy visual comparison by arranging the rectangles corresponding to the data adjacent in the section values necessarily in adjacent positional relation.

In an example embodiment of the present invention, a graphics image generation method of controlling a computer to generate a graphics image for visualizing statistical data is provided. That is, the graphics image generation method inputs the statistical data to be processed, forms a plurality of strip regions in a region corresponding to the entire statistical data, and arranges rectangles for representing individual data of the statistical data in the above described strip regions to generate image data of the region corresponding to the entire statistical data. Furthermore, the method is characterized by, with respect to sequences of the rectangles in the image data, rearranging the rectangles in each of the strip regions such that the rectangles corresponding to the individual data adjacent to each other in the statistical data are also adjacent to each other in the image, to update the image data.

More specifically, the step of arranging the rectangles for representing the individual data of the statistical data in the region corresponding to the entire statistical data often includes the steps of: arranging the rectangles in a line-up order according to the statistical data; and determining, each time the rectangles are arranged, whether a rectangle adjacent to the last arranged rectangle has already been arranged, and if it has been arranged, rearranging shapes and the arrangements of the respective rectangles such that an aspect ratio of a predetermined rectangle among a plurality of these adjacent rectangles approximates to one (1) and the plurality of adjacent rectangles form the strip regions.

In addition, the step of arranging the rectangles in some embodiments includes the steps of: generating the rectangles having sizes with contents of the individual data in the statistical data reflected therein; and arranging the rectangles in the region corresponding to the entire statistical data, in an order determined based on the sizes of the rectangles, and the step of rearranging the shapes and the arrangements of the rectangles includes the step of rearranging the shapes and the arrangements of the rectangles such that the aspect ratio of a predetermined rectangle determined based on the sizes of the rectangles preferentially approximates to one (1).

More specifically, the step of arranging the rectangles often includes the steps of: generating the rectangles having the sizes with the contents of the individual data in the statistical data reflected therein; and arranging the generated rectangles in the region corresponding to the entire statistical data, in a descending (or an ascending) order of the sizes of the rectangles, and the step of rearranging the shapes and the arrangements of the rectangles includes the step of rearranging the shapes and the arrangements of the rectangles such that the aspect ratio of the rectangle having a large (or small) size among the plurality of adjacent rectangles preferentially approximates to one (1).

Alternatively, the step of rearranging the shapes and the arrangements of the rectangles includes the step of rearranging the shapes and the arrangements of the respective rectangles such that the aspect ratio of the rectangle having the farthest aspect ratio from one (1) among the plurality of adjacent rectangles is improved.

In addition, another example of a graphics image generation method according to the present invention includes the steps of: inputting statistical data to be processed, arranging rectangles for representing individual data of the statistical data in a region corresponding to the entire statistical data, according to a line-up order of the statistical data, to generate the graphics image; rearranging shapes and the arrangements of the respective rectangles such that an aspect ratio of a predetermined rectangle among the arranged rectangles approximates to one (1) and sequences of the rectangles line up as strips; and with respect to the sequences of the rectangles in the rearranged image, making the respective rectangles contiguous in the order according to the above described statistical data by inverting a line-up order of the rectangles in each sequence.

In addition, the present invention is also realized as a statistical data drawing apparatus configured as will be described below, for controlling a computer to generate and draw a graphics image for visualizing statistical data. That is, the statistical data drawing apparatus includes: storage means having stored the statistical data to be processed; graphics image generation means for generating the graphics image of the statistical data to be processed, read from the storage means; and output means for outputting the graphics image of the statistical data generated by the graphics image generation means. The graphics image generated by the graphics image generation means is characterized by being constructed such that a region corresponding to the entire statistical data is segmented into a plurality of strip regions, and that drawings for representing individual data of the statistical data are arranged in the strip regions in which the drawings corresponding to the individual data adjacent to each other in the statistical data are also adjacent to each other in the image.

In addition, another example of a statistical data drawing apparatus according to the present invention is characterized by including: a class arranging section for arranging rectangles for representing individual data of the statistical data in a predetermined order, into a line-up order according to the above described statistical data, in a region corresponding to the entire statistical data; a rearrangement processing section for rearranging the arrangements and shapes of the rectangles such that with respect to a plurality of rectangles adjacent to each other, an aspect ratio of a predetermined rectangle approximates to one (1) and the plurality of rectangles line up as strips; and a turn back processing section for, with respect to sequences of the rectangles which have been arranged in the class arranging section and rearranged as necessary in the rearrangement processing section, making the respective rectangles contiguous in the order according to the above described statistical data by rearranging the rectangles such that a line-up order of the rectangles is inverted in each sequence.

Furthermore, the present invention may be realized as a program for making a computer execute the processes corresponding to the respective steps of the above described graphics image generation method, or controlling the computer to function as the above described statistical data drawing apparatus. This program may be provided by storing them in a magnetic disk, an optical disk, a semiconductor memory, or other storage media and distributing them, or delivering them via a network.

The present invention will be described in detail below based on an embodiment shown in the accompanying drawings. First, a summary of the present invention will be described. The present invention generally uses a computer system and generates a graphics image for visualizing a number distribution of statistical data in a representation method of region segmentation type.

In the present invention, the statistical data is represented visually by segmenting a rectangle region corresponding to the entire statistical data into strip regions and segmenting the strip regions into classes. Here, the strip region indicates a plurality of rectangles obtained by segmenting the rectangle region corresponding to the entire statistical data vertically or horizontally. In addition, the class is a pair of a class value and a section value of the classified statistical data, and is represented as a rectangle arranged in the strip region. The size of the class (rectangle) indicates the class value, and the order of the class to be arranged indicates the section value.

In addition, in the present invention, the arrangement order of the classes is inverted between the strip regions adjacent to each other. That is, if the classes are arranged from bottom to top in a predetermined strip region, the classes are arranged from top to bottom in the other strip region adjacent to the predetermined strip region. Thereby all the classes adjacent to each other in the section values become also adjacent to each other on a screen.

FIG. 1 shows a configuration of a computer system as a graphics image generation apparatus for drawing the statistical data according to the present embodiment. Referring to FIG. 1, a computer system 10 is provided with a processing unit (a CPU and a video chip) 11 for performing a graphics display process under the control of a program, a main memory 12 having stored the program for controlling the processing unit 11, a video memory 13 and a display unit 14 for displaying the graphics image of the statistical data generated by the processing unit 11, and a memory unit 15 having stored the statistical data to be processed.

The processing unit 11, which is controlled by the program stored in the main memory 12, reads the statistical data to be processed, from the memory unit 15, generates the graphics image of the statistical data (image data) and stores the graphics image in the video memory 13. Then the graphics image stored in the video memory 13 is displayed at the display unit 14. The main memory 12 is also used to store temporarily the image data generated in course of the graphics image generation process by the processing unit 11.

It should be noted that FIG. 1 shows only a configuration for realizing the present embodiment. In effect, of course, in addition to the configuration shown in FIG. 1, an input device such as a keyboard or a mouse for inputting various commands or data, a sound output mechanism or various peripheral devices, a network interface and the like are provided. In addition, the statistical data to be processed not only may be read from the memory unit 15 as described above, but also may be inputted from outside via a network and the like.

Figure 2:
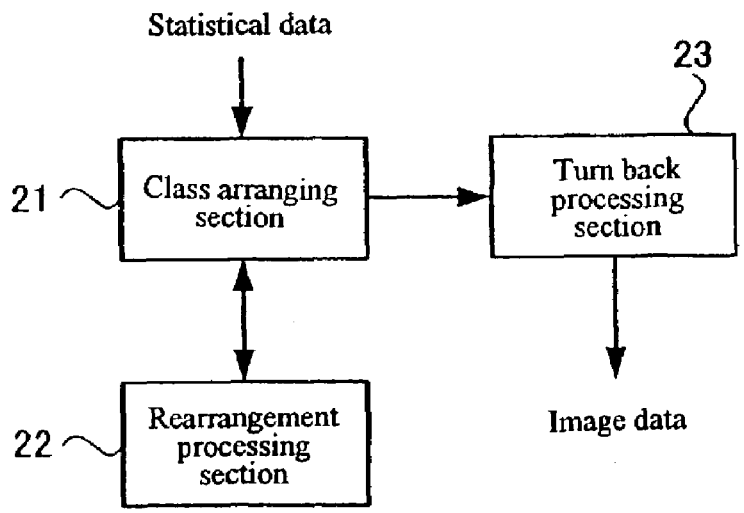
FIG. 2 illustrates a system configuration of the graphics image generation apparatus for drawing the statistical data according to the present embodiment.

FIG. 2 shows a system configuration of the graphics image generation apparatus for drawing the statistical data according to the present embodiment. In the present embodiment, the respective classes of the classified statistical data are sequentially arranged and if necessary, rearranged such that shapes of the rectangles corresponding to the arranged classes become as near square as possible, that is, differences between longer sides and shorter sides of the rectangles become as small as possible (however, areas of the respective classes reflect the class values, so the areas are not altered). Then, after all the classes are arranged, the classes are rearranged such that the arrangement order of the classes is inverted between the strip regions adjacent to each other (which is referred to as "turn back chain type"). Thereby the respective classes are turned back in each strip region to be arranged contiguously as unicursal in an order of the section values.

Referring to FIG. 2, the graphics image generation apparatus according to the present embodiment is provided with a class arranging section 21 for segmenting the statistical data to be processed into the classes and arranging them, a rearrangement processing section 22 for rearranging the arrangements of the classes such that the shapes of the rectangles corresponding to the classes arranged by the class arranging section 21 become as near square as possible, and a turn back processing section 23 for rearranging sequences of the above described classes in the turn back chain type after all the classes are arranged by the class arranging section 21. Each component shown in FIG. 2 is a virtual software block to be realized in the processing unit 11 controlled by a computer program stored in the main memory 12 shown in FIG. 1. The above described computer program for controlling the processing unit 11 is provided by storing it in a storage medium such as a CD-ROM, a floppy disk and the like and distributing it, or transmitting it via a network.

In the configuration shown in FIG. 2, the class arranging section 21 inputs the statistical data to be processed, segments the above described statistical data into the classes, and arranges the rectangles corresponding to the respective classes in a rectangular region corresponding to the above described entire statistical data in a predetermined order.

Now, a method of arranging the classes by the class arranging section 21 will be described in detail. The statistical data configured with n classes will be considered. The class values of the classes are represented in the order of the section values as $r_1, \ldots, r_n$. In addition, the area of the rectangular region corresponding to the entire statistical data is represented as $A_{a1}$. Then, the areas of the rectangles corresponding to individual data (classes) for configuring the statistical data $A_1, \ldots, A_n$ may be determined by Equation 1 as follows (hereinafter, these characters $A_1, \ldots, A_n$ are also used with respect to the rectangles themselves).

[Equqtion 1]

$$A_k = \frac{r_k}{\sum_{i=1}^{n} r_i} A_{a11} \qquad \text{[Equation 1]}$$

In addition, the rectangles $A_1, \ldots, A_n$ sorted in a predetermined order (ascending order or descending order) based on the class values are represented as $A_{s1}, \ldots, A_{sn}$. That is, according to the present embodiment, the order in which the respective classes line up is pursuant to the section values, while the order of arranging the classes is determined according to the areas of the respective classes (class values).

By way of example, a case will be described where the classes of the statistical data are arranged in the descending order of the class values. First, the class arranging section 21 assumes the rectangle configuring the class such that "one rectangle configures one strip region", and calculates the width and the height of the rectangle. If the width and the height of a predetermined rectangle $A_k$ ($1 \leq k \leq n$) are ($w_k, h_k$), and the width and the height of the rectangular region $A_{all}$ corresponding to the entire statistical data are ($w_{all}, h_{all}$), then ($w_k, h_k$) are calculated by Equation 2 as follows.

[Equation 2]

$$w_k = \frac{A_k}{A_{all}} w_{a11} \qquad \text{[Equation 2]}$$

Figure 3:
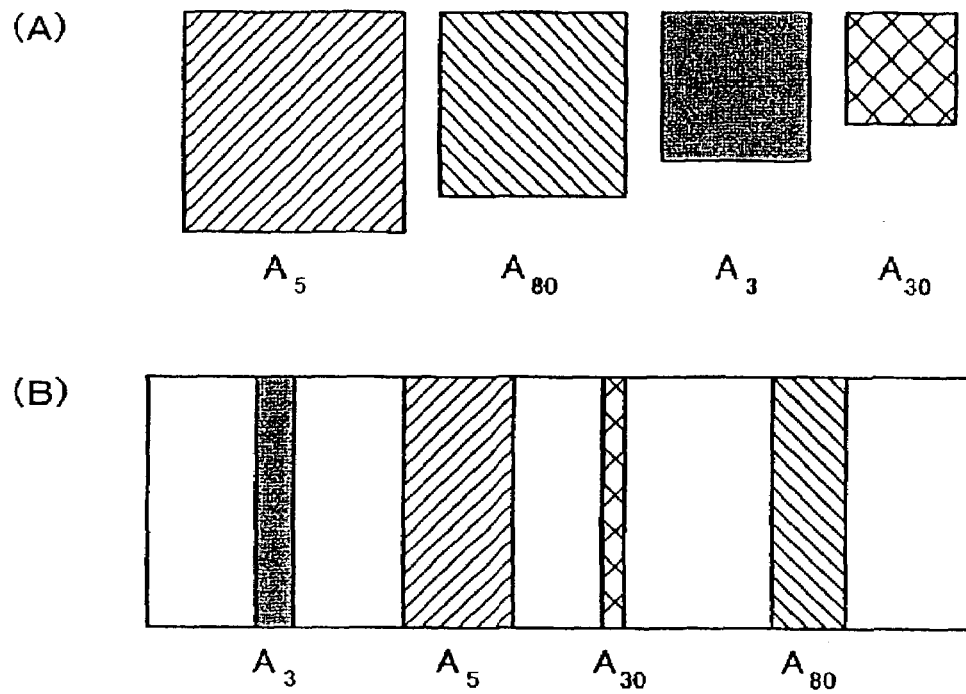
FIG. 3 illustrates a method of arranging classes by a class arranging section of the present embodiment.

FIG. 3 illustrates the method of arranging the classes by the class arranging section 21. In an example shown in FIG. 3, based on the sizes of the class values, the arrangement is performed in the order of the classes $A_5, A_{80}, A_3, A_{30}$ as shown in FIG. 3(A) (where only upper four classes are shown in FIG. 3). The respective classes $A_5, A_{80}, A_3, A_{30}$ are arranged within the rectangular region $A_{all}$ such that "one rectangle configures one strip region", that is, the classes have the same heights as the rectangular region $A_{all}$ ($h_k = h_{all}$). In addition, though the arrangement order is the descending order of the areas in the respective classes, the respective classes line up according to the section values, thereby there are suitable spaces among the classes $A_5$, $A_{80}$, $A_3$, $A_{30}$, respectively.

The rearrangement processing section 22 rearranges the classes arranged as described above by the class arranging section 21 if necessary, so that a desired class is arranged in the shape as near square as possible. A method of rearranging the classes by the rearrangement processing section 22 will be described in detail. The rearrangement processing section 22 determines, each time the classes are arranged by the class arranging section 21, whether the rearrangement should be performed or not, as will be described below. First, with respect to the last class arranged by the class arranging section 21, it is determined whether a class having an adjacent section value (that is, a class which is adjacent to the last arranged class on the screen) has already been arranged. In other words, when the predetermined rectangle $A_k$ ($1 \leq k \leq n$) is arranged, it is determined whether a rectangle $A_{k-1}$ or a rectangle $A_{k+1}$ has already been arranged.

If either of the rectangle $A_{k-1}$ or the rectangle $A_{k+1}$ has already been arranged, it is determined whether the rectangle $A_k$ is merged into the strip region including the above described rectangle $A_{k-1}$ or the rectangle $A_{k+1}$. Here, as an indication of the determination on the merging, the present embodiment uses a ratio of the width to the height of the rectangle (aspect ratio). If the aspect ratio of the rectangle $A_k$ is $a_k$, $a_k$ is calculated by Equation 3 as follows:

$$a_k = \begin{Bmatrix} w_k/h_k (w_k > h_k) \\ h_k/w_k (w_k < h_k) \end{Bmatrix}$$ [Equation 3]

For example, the case will be considered where it is determined the rectangle $A_k$ is merged into the strip region configured with the rectangles $A_{k+1}, \ldots, A_1$ (k<1). If the width of the strip region consisting of the rectangles $A_{k+1}, \ldots, A_1$ is $w_{before}$, the width of the strip region $w_{after}$ after the rectangle $A_k$ is merged is calculated by Equation 4 as follows:

$$w_{after} = \frac{\sum_{i=k}^{1} A_i}{\sum_{i=k+1}^{1} A_i} w_{before}$$ [Equation 4]

In addition, the largest rectangle among the rectangles $A_{k+1}, \ldots, A_1$ is represented as $A_{imp}$ (in this example with the arrangement in the descending order, the largest rectangle is chosen, however with the arrangement in the ascending order, the smallest rectangle is chosen). Then, if the height of the rectangle $A_{imp}$ before the rectangle $A_k$ is merged is $h_{before}$, and the height of the rectangle $A_{imp}$ after the merging is $h_{after}$, they are represented by Equation 5 as follows:

$$h_{before} = A_{imp}/W_{before}$$

$$h_{after} = A_{imp}/W_{after}$$ [Equation 5]

Using the width $w_{before}$, the width $w_{after}$, the height $h_{before}$ and the height $h_{after}$, as calculated by the above described respective equations, an aspect ratio $a_{before}$ before the merging of the rectangle $A_{imp}$ and an aspect ratio $a_{after}$ after the merging of the rectangle $A_{imp}$ are calculated. Then, if $a_{before} > a_{after}$, the aspect ratio of the rectangle $A_{imp}$ is improved (that is, the aspect ratio approximates to one (1)) by the merging, so the rectangle $A_{imp}$ is merged. On the other hand, if $a_{before} \leq a_{after}$, the aspect ratio of the rectangle $A_{imp}$ is not improved (that is, the aspect ratio does not approximate to one (1)) by the merging, so the rectangle $A_{imp}$ is not merged.

Figure 4:
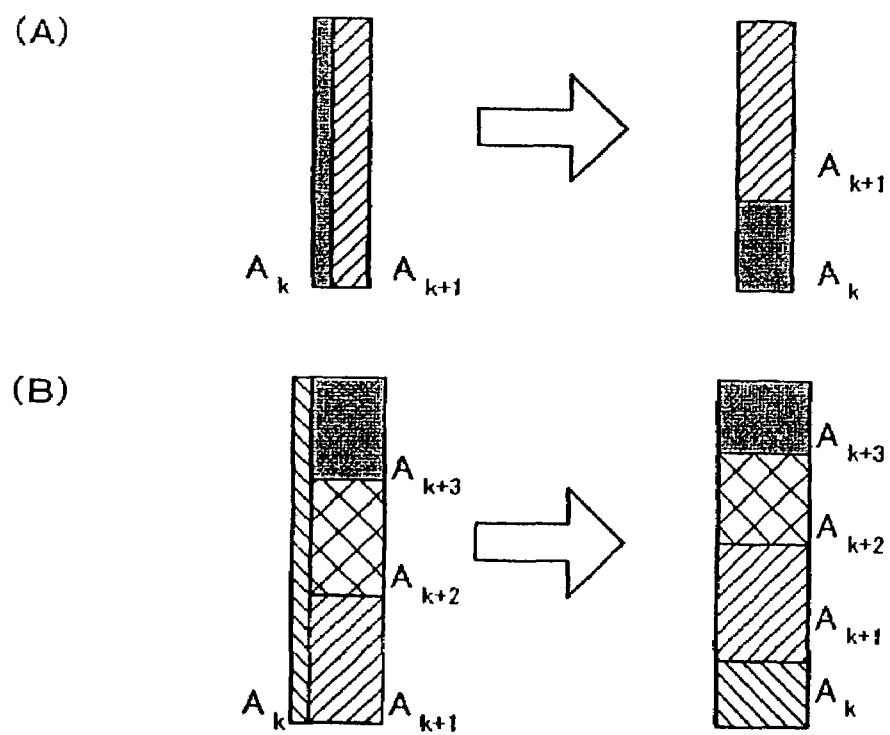
FIG. 4 shows a reedit processing section of the present embodiment merging the classes to rearrange strip regions.

FIG. 4 shows merging of the classes to rearrange the strip regions. In an example shown in FIG. 4(A), in which at the point when the rectangle $A_k$ is arranged, the rectangle $A_{k+1}$ has been already arranged at a position adjacent to the rectangle $A_k$, the aspect ratio of the rectangle $A_{k+1}$ is improved by merging the two strip regions into one, so they are merged. In addition, in an example shown in FIG. 4(B), in which at the point when the rectangle $A_k$ is arranged, the strip region consisting of the rectangles $A_{k+1}, A_{k+2}, A_{k+3}$ has been already arranged at the position adjacent to the rectangle $A_k$, the aspect ratio of the largest rectangle $A_{k+1}$ is improved by merging the two strip regions into one, so they are merged.

In addition, in the present embodiment, the rearrangement processing section 22 not only may merge the two strip regions into one strip region as described above, but also may rearrange them as the two strip regions in which forms of the classes are changed.

The case will be considered where, when the rectangle $A_k$ is arranged adjacent to the strip region configured with the rectangles $A_{k+1}, \ldots, A_1$ (k<1), the sequences of the classes are rearranged as the strip region consisting of the rectangles $A_k, \ldots, A_m$ (k<m) and the strip region consisting of the rectangles $A_{m+1}, \ldots, A_1$ (m<1). If the width of the sum of the two strip regions is $w_{before}$, the width $w_{after1}$ of the strip region consisting of the rectangles $A_k, \ldots, A_m$ (k<m) and the width $W_{after2}$ of the strip region consisting of the rectangles $A_{m+1}, \ldots, A_1$ (m<1) are calculated by Equation 6 as follows:

$$w_{after1} = \frac{\sum_{i=k}^{m} A_i}{\sum_{i=k+1}^{1} A_i} w_{before}$$ [Equation 6]

$$w_{after2} = \frac{\sum_{i=m+1}^{1} A_i}{\sum_{i=k+1}^{1} A_i} w_{before}$$

In addition, the largest rectangle among the rectangles $A_{k+1}, \ldots, A_1$ (k<1) already arranged in the strip region is represented as $A_{imp}$ (in this example with the arrangement in the descending order, the largest rectangle is chosen, however with the arrangement in the ascending order, the smallest rectangle is chosen). Then, if the height of the rectangle $A_{imp}$ before the rectangle $A_k$ is arranged is $h_{before}$, and the height of the rectangle $A_{imp}$ after the arrangement is $h_{after}$, they are represented by Equation 7 as follows:

$$h_{before} = A_{imp}/W_{before}$$

$$h_{after} = A_{imp}/W_{after}$$ [Equation 7]

(where $W_{after} = W_{after1}$ (k<imp$\leq$m) and $W_{after} = W_{after2}$ (m<imp$\leq$1)

Using the width $W_{before}$, the width $W_{after}$, the height $h_{before}$ and the height $h_{after}$, as calculated by the above described respective equations, the aspect ratio $a_{before}$ before the merging of the rectangle $A_{imp}$ and the aspect ratio $a_{after}$ after the merging of the rectangle $A_{imp}$ are calculated. Then, if $a_{before} > a_{after}$, the aspect ratio of the rectangle $A_{imp}$ is improved (that is, the aspect ratio approximates to one (1)) by the merging, so the rectangle $A_{imp}$ is merged. On the other hand, if $a_{before} \leq a_{after}$, the aspect ratio of the rectangle $A_{imp}$ is not improved (that is, the aspect ratio does not approximate to one (1)) by the merging, so the rectangle $A_{imp}$ is not merged. The above described process is repeated varying m in a range of k+1<m<l, and the strip regions are rearranged in a condition where the best aspect ratio is calculated.

Figure 5:
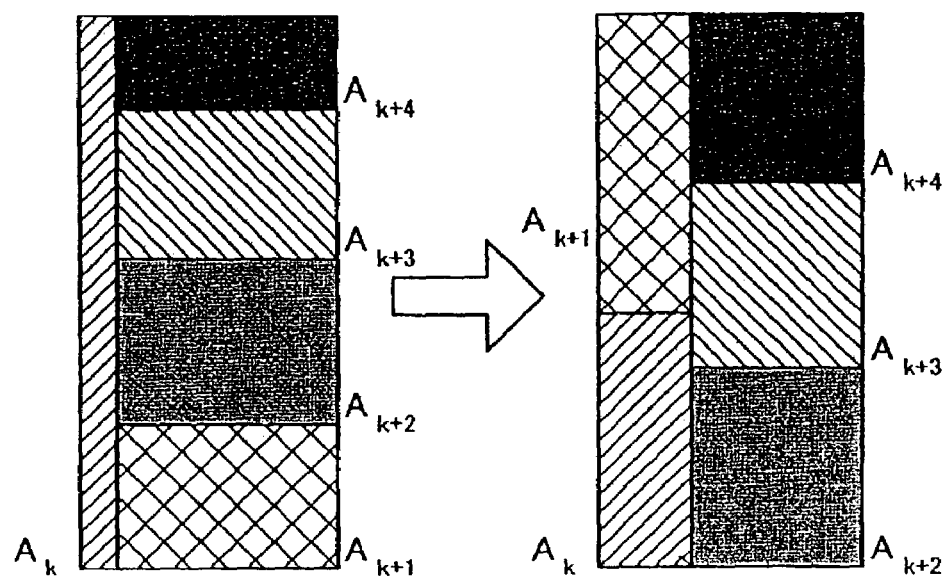
FIG. 5 shows rearranging of two strip regions as the other two strip regions in different configurations.

FIG. 5 shows rearranging of the two strip regions as the other two strip regions in different configurations. In an example shown in FIG. 5, in which at the point when the rectangle $A_k$ is arranged, the strip region consisting of the rectangles $A_{k+1}, A_{k+2}, A_{k+3}, A_{k+4}$ has been already arranged at the position adjacent to the rectangle $A_k$, the best aspect ratio may be obtained by rearranging the two strip regions as the strip region consisting of the rectangles $A_k, A_{k+1}$ and the strip region consisting of the rectangles $A_{k+2}, A_{k+3}, A_{k+4}$, so they are rearranged accordingly.

In the present embodiment, as the classes are arranged by the class arranging section 21, the process of rearranging the strip regions as described above by the rearrangement processing section 22 frequently happens. Then, the shape of the class previously arranged is evaluated, and the rearrangement is performed such that the shape becomes a shape having a smaller aspect ratio. Here, if the class previously arranged (that is, the class which has a higher class value if the classes are arranged sequentially in the descending order of the class values) is considered as the data on which a user of the statistical data (for example, a user of the present embodiment) puts higher importance, the shape of the class having a higher importance will be improved to a near square shape, which is easy to compare visually with the other classes. That is, if the user, who desires the graphics image of the statistical data according to the present embodiment, puts higher importance on the comparison of the classes having the high class values, the classes having the higher importance with the high class values are shown in the near square shapes by arranging the classes in the descending order of the class values, so that they may become easy to compare visually. On the other hand, if the user puts higher importance on preventing the classes having the small class values from being collapsed thinly and making them easier to compare visually, the classes having the higher importance with the small class values are shown in the near square shapes by arranging the classes in the ascending order of the class values, so that they may be superior in visibility.

It should be noted that the aspect ratios of the respective classes may be changed because the class having the aspect ratio which is made to approximate to one (1) is changed depending on whether the user puts higher importance on the classes having the large classes or the classes having the small classes. Therefore, the number of the strip regions to be formed in the rectangular region corresponding to the entire statistical data and the thickness of the individual strip region are also changed.

In addition, in the present embodiment, a direction in which the classes arranged by the class arranging section 21 line up and a direction in which the classes rearranged by the rearrangement processing section 22 line up are defined in a certain direction in order to reflect the order of the section values of the respective classes. The class arranging section 21 arranges the classes, for example, such that the classes line up in a direction from the left to the right in the rectangular region corresponding to the entire statistical data. More specifically, when a predetermined class is arranged, the class is arranged to position at the left hand of the class having the section value higher than the class to be arranged, and at the right hand of the class having the section value smaller than the class to be arranged, among the classes already arranged.

Similarly, the rearrangement processing section 22 arranges the classes, for example, such that the classes line up in a direction from bottom to top in the strip regions.

After all the classes are arranged by the class arranging section 21, the turn back processing section 23 rearranges the classes such that the arrangement order of the classes is inverted in the strip regions adjacent to each other (to be in "turn back chain type"). For example, class data are arranged from bottom to top in the strip regions at odd positions from the left in the rectangular region corresponding to the entire statistical data, and inversely the class data are arranged from top to bottom in the strip regions at even positions. Thereby, all the classes are arranged contiguously so that the classes adjacent to each other in the section values will be necessarily adjacent to each other also on the screen.

However, in the present embodiment, as described above, since the class arranging section 21 arranges the classes in the descending order of the class values regardless of the order of the section values, and then the rearrangement processing section 22 rearranges the strip regions at any time, it may not be determined what positions the respective strip regions are to be at until the arrangement of all the classes is completed. Accordingly, after the arrangement of all the classes is completed, the turn back processing section 23 recalculates coordinate values of the classes, for example, such that the classes are arranged from bottom to top in the strip regions at odd positions and the classes are arranged from top to bottom in the strip regions at even positions.

Figure 6:
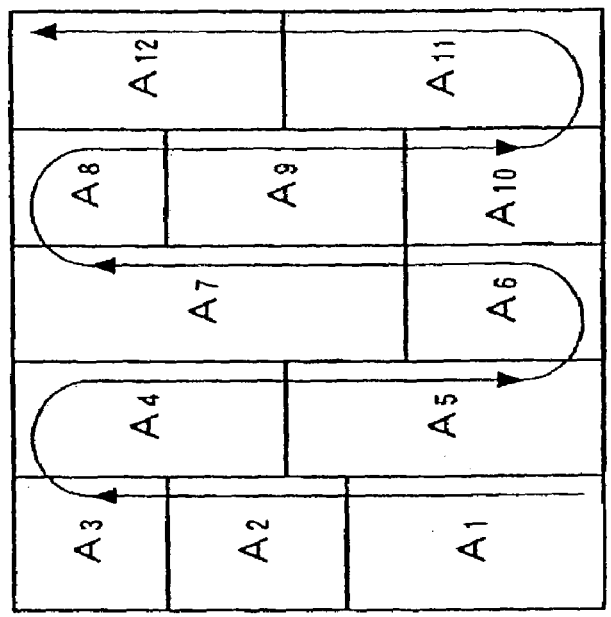
FIG. 6 shows a turn back processing section of the present embodiment converting an arrangement order of the classes into turn back chain type.
Figure 6:
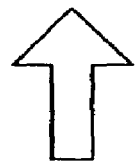
Figure 6:
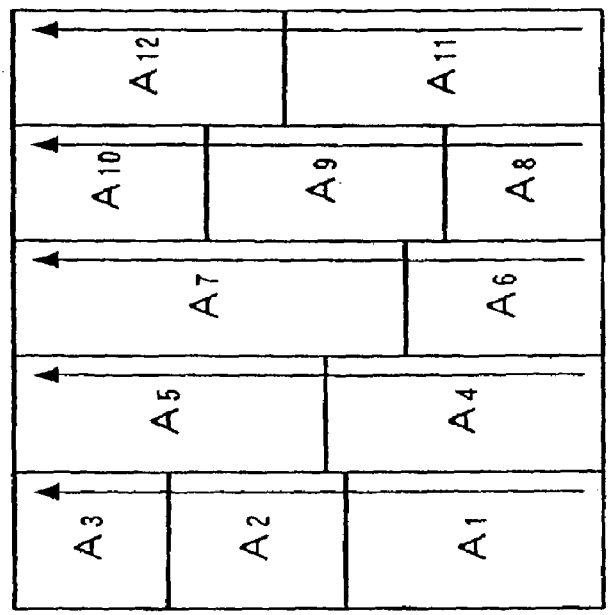

FIG. 6 shows converting of the arrangement order of the classes into the turn back chain type. In an example shown in FIG. 6, after the classes are lined up from bottom to top in the respective strip regions and the arrangement of all the classes is completed, the arrangement order of the classes is inverted in the respective strip regions at even positions from the left, thereby the arrangement of "turn back chain type" is realized.

Figure 7:
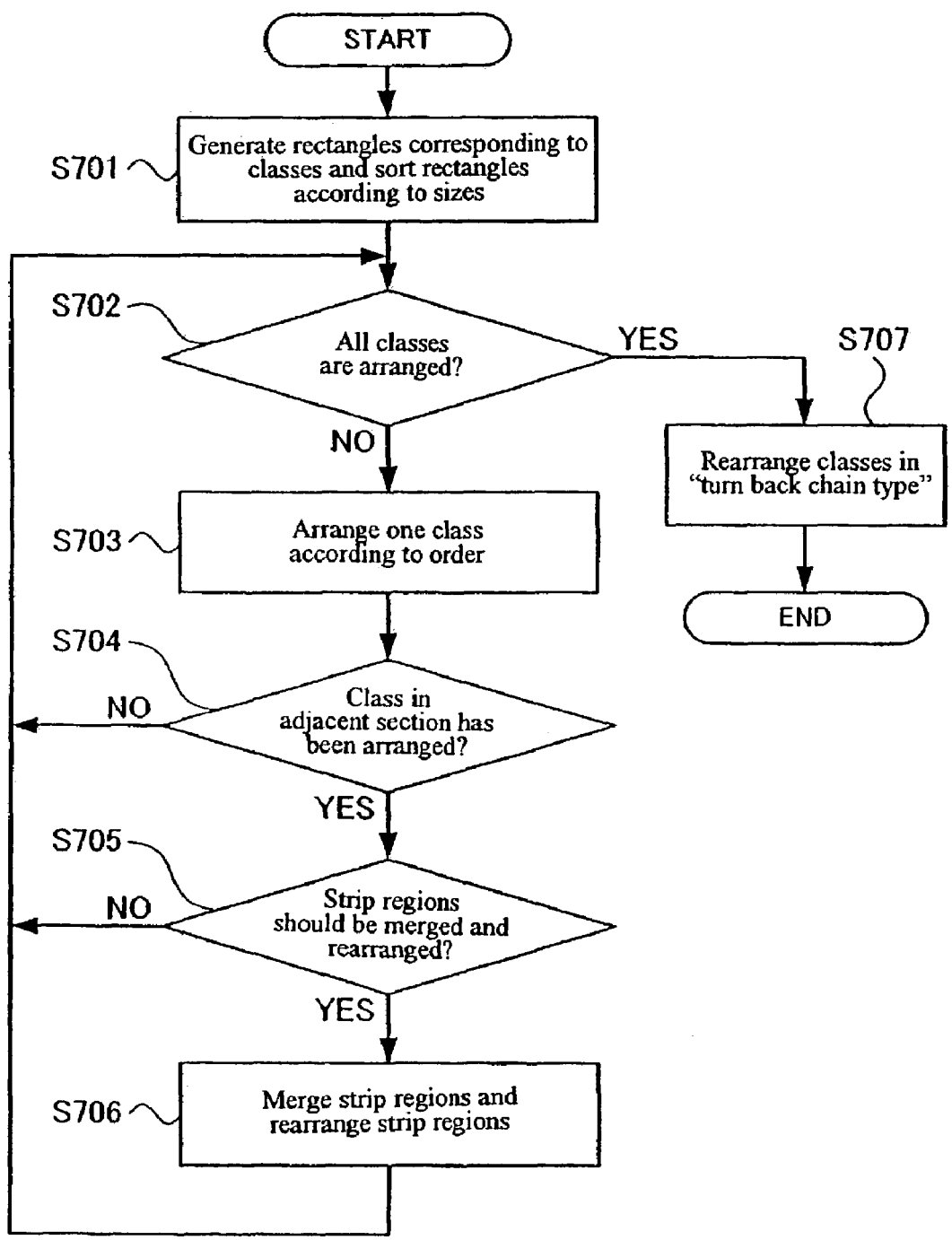
FIG. 7 is a flowchart illustrating a sequence of a process flow for drawing the statistical data according to the present embodiment.

FIG. 7 is a flowchart illustrating a sequence of a process flow for drawing in "turn back chain type" by the above described class arranging section 21, the rearrangement processing section 22 and the turn back processing section 23. As shown in FIG. 7, the class arranging section 21 reads the statistical data to be processed from the memory unit 15, generates the classes for drawing the above described statistical data, that is, the rectangles having the sizes with the class values reflected therein, and sorts them according to the sizes of the class values (step 701). As described above, in the present embodiment, since the classes may be arranged in the descendent order or the ascending order of the class values depending on the user's designation and the like, the classes are lined up in the descendent order or the ascending order of the class values in this step. Then, the following process is repeated until all the classes are arranged within the rectangular region corresponding to the entire statistical data (step 702).

First, the class arranging section 21 arranges one class according to the line-up order in step 701 (step 703). Then, the rearrangement processing section 22 determines whether a class in the section adjacent to the class arranged in step 703 has already been arranged (step 704). If the class having the adjacent section value has already been arranged, then it is determined whether the strip regions should be rearranged between the above described class and the class arranged in step 703, that is, whether the aspect ratio of the class having the high importance may be smaller by the rearrangement of the strip regions (step 705). If the aspect ratio of the class having the high importance may be in an excellent condition by the rearrangement of the strip regions, the rearrangement processing section 22 rearranges the strip region with the class arranged in step 703 and the strip region including the class adjacent to the above described class (step 706).

After the strip regions are rearranged (step 706) or it is determined that the strip regions should not be rearranged (step 705), or if the class having the adjacent section value with respect to the class arranged in step 703 has not been arranged yet (step 704), the image data generated by this point is stored temporarily in the main memory 12, and the process returns to step 702. Then, the further process from step 703 is repeated with respect to the next class in the line-up order in step 701, and the image data is updated.

When the process is repeated and all the classes are arranged, then the turn back processing section 23 reads the generated image data from the main memory 12, and inverts the arrangement order of the classes in every other strip region in the above described graphics image to complete the drawing in "turn back chain type" (step 707). The completed graphics image is displayed at the display unit 14 via the video memory 13.

It should be noted that, in the above described operation, if the classes are arranged sequentially in the descending order of the class values, and the rearrangement is performed such that the classes having the high class values preferentially become the shapes of the small aspect ratios (that is, the near square shapes), the classes having the high class values, that is, the rectangles having the large sizes become the near square shapes, thereby they may become easy to compare visually.

On the other hand, if the classes are arranged sequentially in the ascending order of the class values, and the rearrangement is performed such that the classes having the small class values preferentially become the shapes of the small aspect ratios (that is, the near square shapes), the classes having the small class values, that is, the rectangles having the small sizes become the near square shapes, thereby they may be prevented from being collapsed thinly to become inferior in the visibility.

In addition, it is also possible to perform the rearrangement such that excellent aspect ratios may be obtained overall, that is, such that the rectangles collapsed thinly with the high aspect ratios may not appear. In this case, the respective classes are arranged sequentially from the left edge or the right edge of the rectangular region corresponding to the entire statistical data, according the section values. Therefore, in step 701 as shown in FIG. 7, only the rectangles corresponding to the classes are generated, and the sorting according to the class values is not performed. In addition, the classes are arranged in the order of the section values, it is determined whether the rearrangement should be performed in step 705 each time the classes are arranged.

Then, this rearrangement is performed by selecting the arrangement of the classes such that not only the aspect ratio of the class having the high importance (that is, with the large or small size) among the adjacent classes is considered, but also the value of the worst aspect ratio (that is, farthest from one (1)) among all the classes is best improved, that is, such that any class is prevented from being collapsed thinly.

Figure 8:
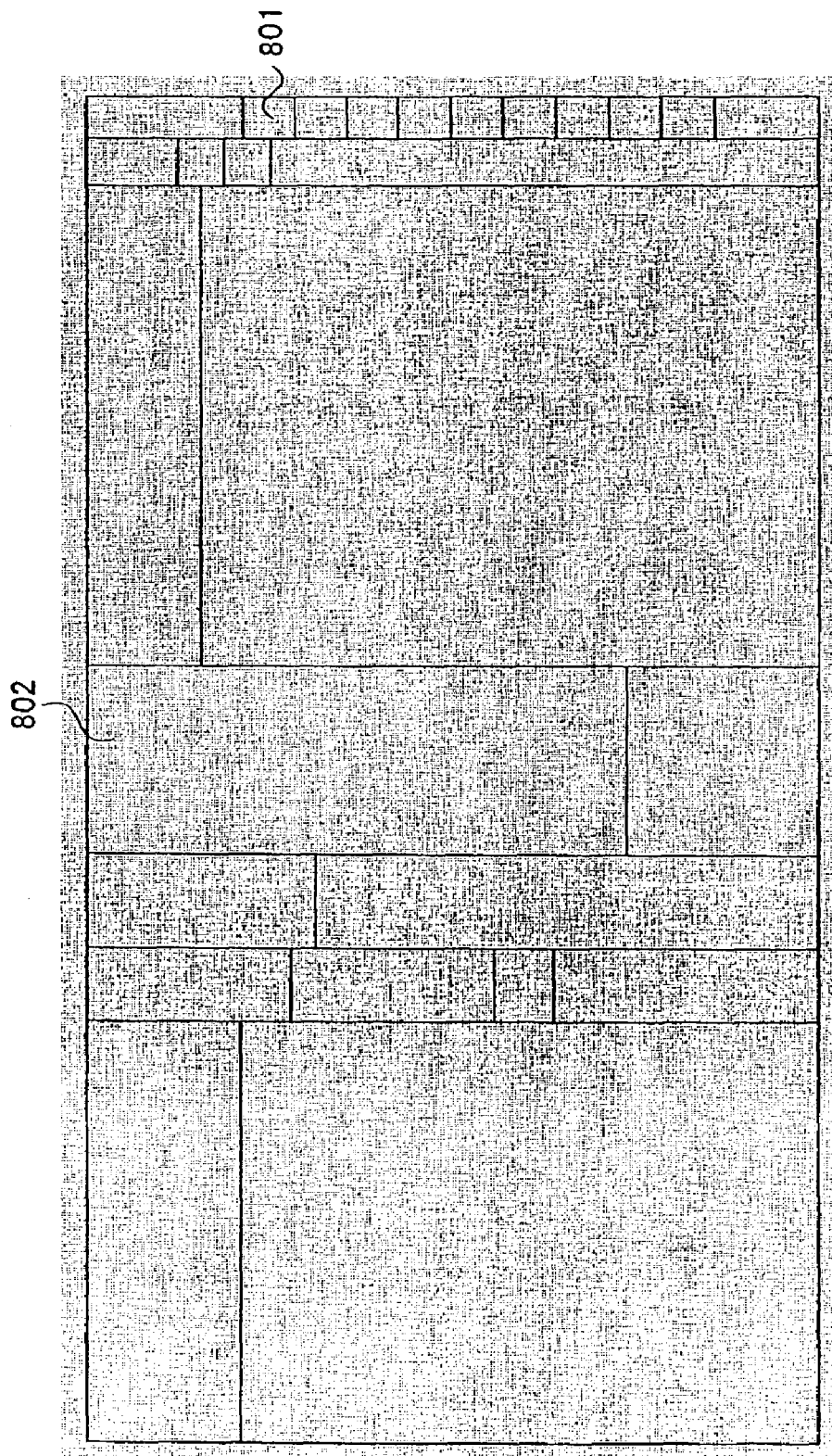
FIG. 8 shows an example of a graphics image visualized with a predetermined statistical data according to the present embodiment, showing an example of drawing such that higher importance is put on the small classes.
Figure 9:
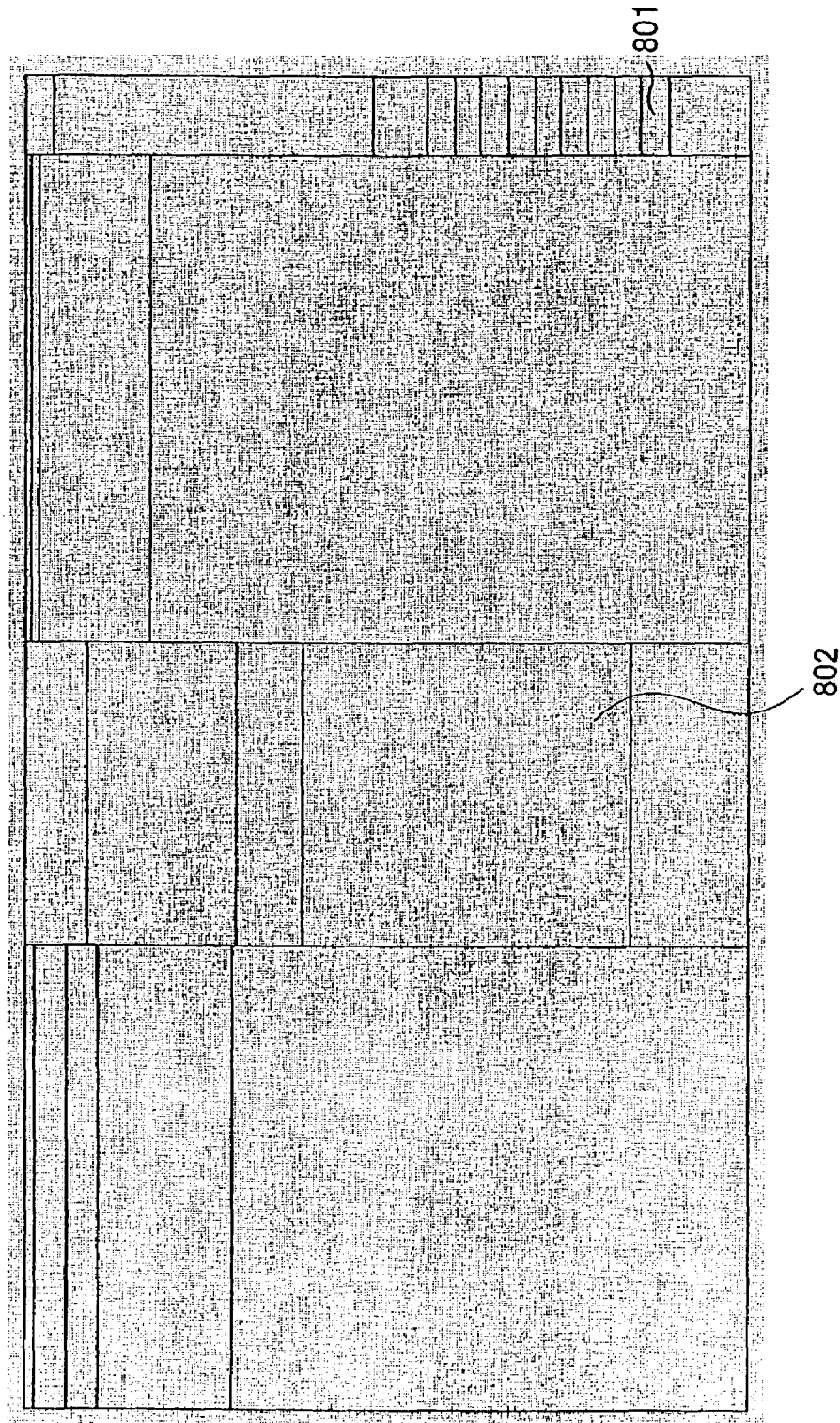
FIG. 9 shows an example of a graphics image visualized with a predetermined statistical data according to the present embodiment, showing an example of drawing such that higher importance is put on the large classes.
Figure 10:
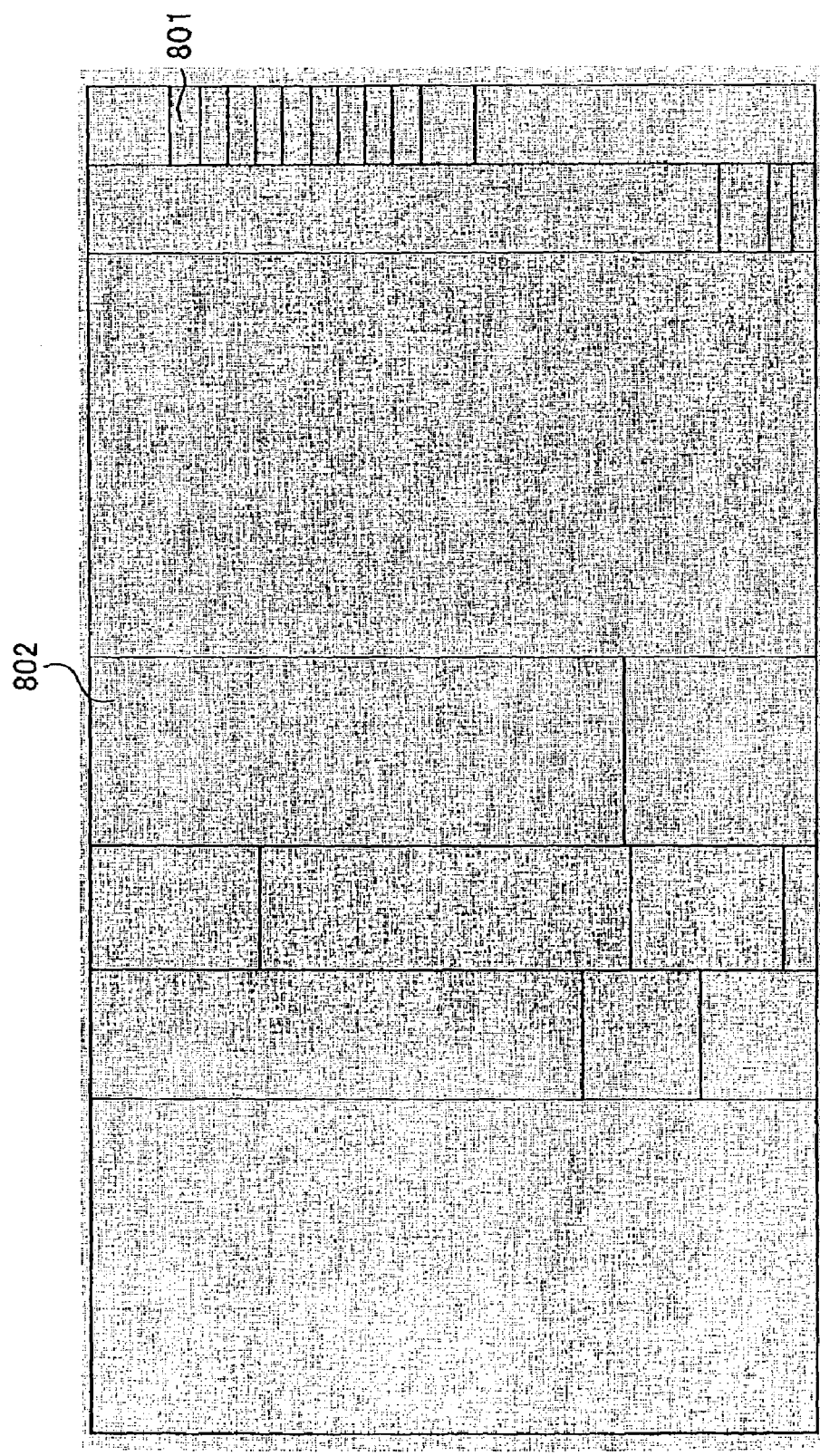
FIG. 10 shows an example of a graphics image visualized with a predetermined statistical data according to the present embodiment, showing an example of drawing such that excellent aspect ratios may be obtained overall.

FIGS. 8 to 10 show examples of the graphics image visualized with a predetermined statistical data according to the present embodiment. FIG. 8 shows the case where the drawing is performed such that higher importance is put on the small classes, FIG. 9 shows the case where the drawing is performed such that higher importance is put on the large classes, and FIG. 10 shows the case where the drawing is performed such that the excellent aspect ratios may be obtained overall.

Referring to FIG. 8, within the rectangular region corresponding to the entire statistical data, 7 strip regions are formed and 27 classes are arranged. The class having the relatively small size such as class 801 has the near square shape. In addition, referring to FIG. 9, within the same rectangular region as FIG. 8, 4 strip regions are formed and 27 classes are arranged similarly. The class having the relatively large size such as class 802 has the near square shape. Furthermore, referring to FIG. 10, within the same rectangular region as FIGS. 8 and 9, 7 strip regions are formed and 27 classes are arranged similarly. As seen in FIG. 10, there is no class having the aspect ratio of the extreme high value as shown in FIG. 9.

In each image shown in FIGS. 8 to 10, when the value of the aspect ratio in the class is evaluated, with respect to the aspect ratio of the class having the class value of the size in lower 5 percents, the worst value is 1.4423 and the average value is 1.4212 in the case of FIG. 8, the worst value is 124.8798 and the average value is 105.6457 in the case of FIG. 9, and the worst value is 4.0638 and the average value is 3.5683 in the case of FIG. 10.

Therefore, the aspect ratio of the class of the small size approximates to one (1) and more excellent drawing result is obtained by arranging the classes such that higher importance is put on the classes of the small sizes (in the case of FIG. 8).

In addition, with respect to the aspect ratio of the class having the class value of the size in upper 5 percents, the worst value is 11.4301 and the average value is 5.8763 in the case of FIG. 8, the worst value is 5.9467 and the average value is 2.3871 in the case of FIG. 9, and the worst value is 11.4301 and the average value is 4.4593 in the case of FIG. 10. Therefore, the aspect ratio of the class of the large size approximates to one (1) and the more excellent drawing result is obtained by arranging the classes such that higher importance is put on the classes of the large sizes (in the case of FIG. 9).

Furthermore, when the aspect ratios of all the classes are checked, the worst value is 11.4301 and the average value is 2.9132 in the case of FIG. 8, the worst value is 124.8798 and the average value is 23.8167 in the case of FIG. 9, and the worst value is 11.4301 and the average value is 2.4394 in the case of FIG. 10. Therefore, the class having the aspect ratio of the extreme high value may not appear and the drawing result with the excellent visibility is obtained by rearranging the classes such that the excellent aspect ratios may be obtained overall (in the case of FIG. 10). It should be noted that, in this example, though even in the case of FIG. 8 where higher importance is put on the small classes, the worst value is 11.4301 and the excellent drawing result is obtained, the more excellent result with respect to the average value may be obtained in the case of FIG. 10.

Figure 11:
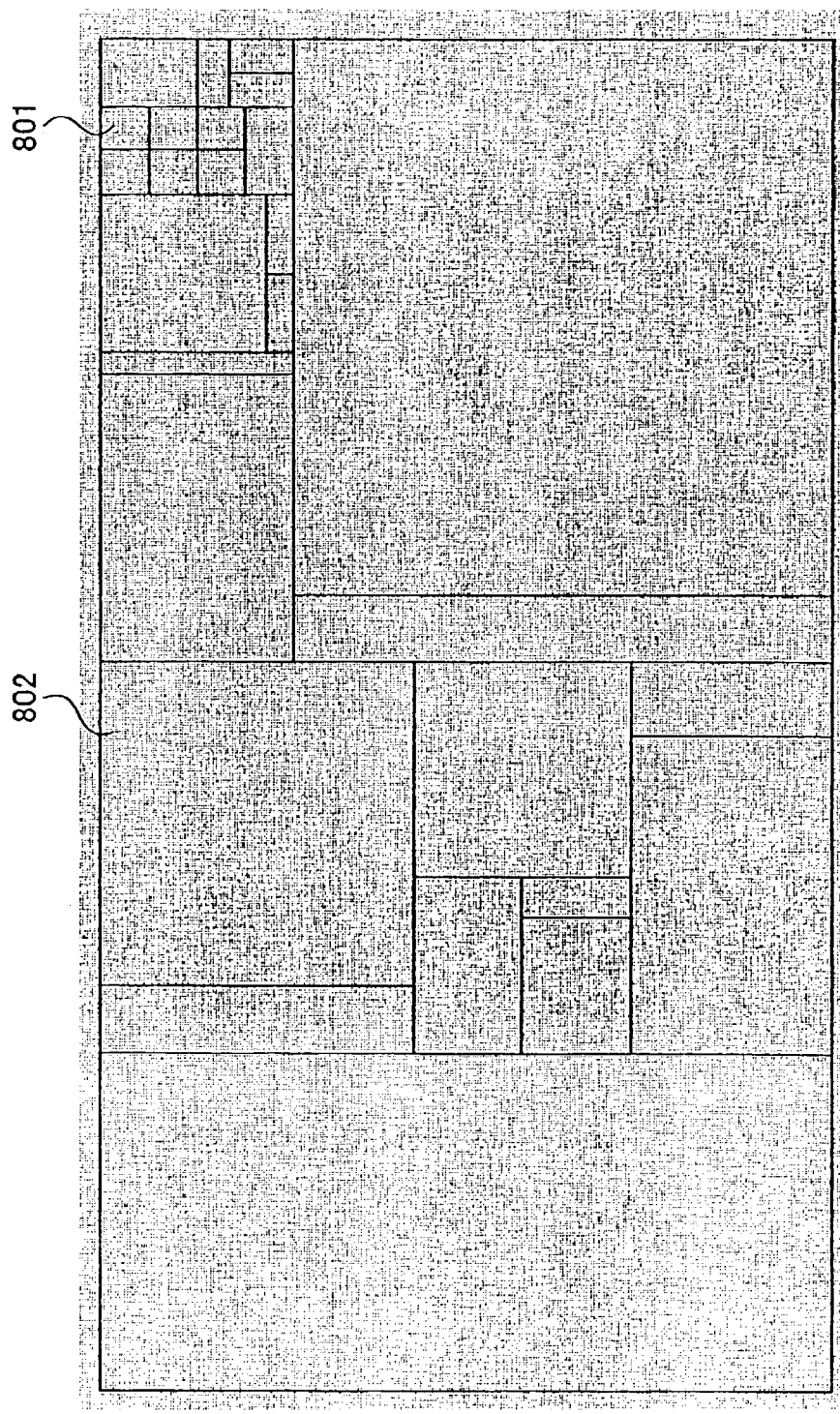
FIG. 11 shows an example of a graphics image generated with respect to similar statistical data as the examples shown in FIGS. 8 to 10, in conventional Ordered Treemap method.
Figure 12:
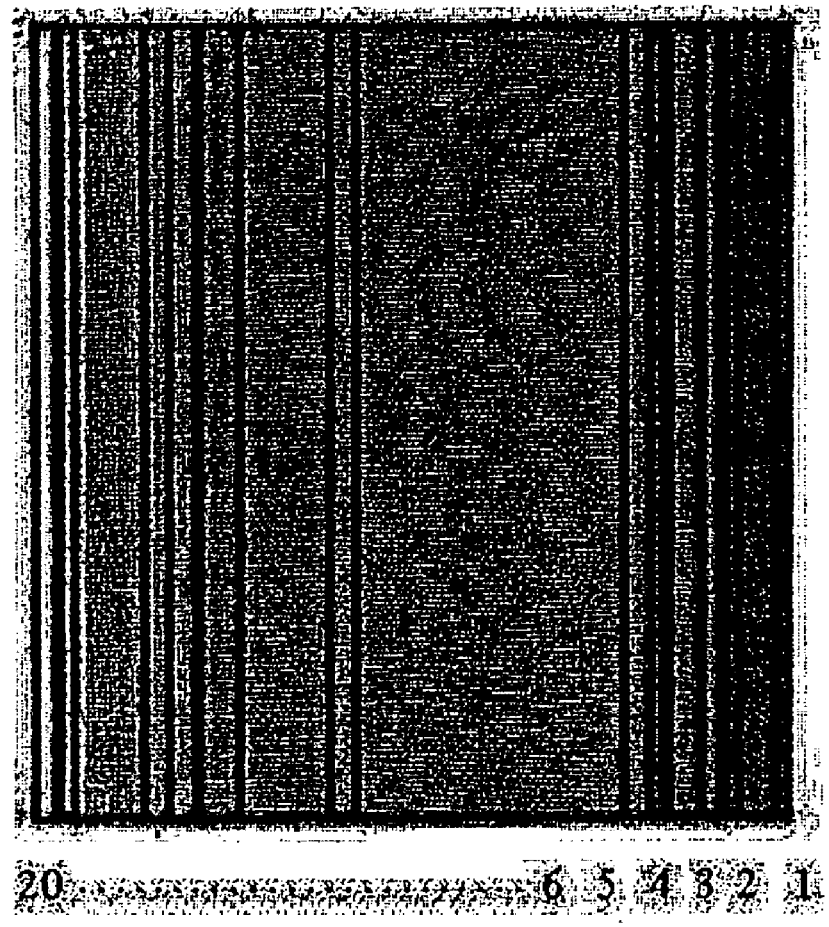
FIG. 12 shows an example of a column chart.
Figure 13:
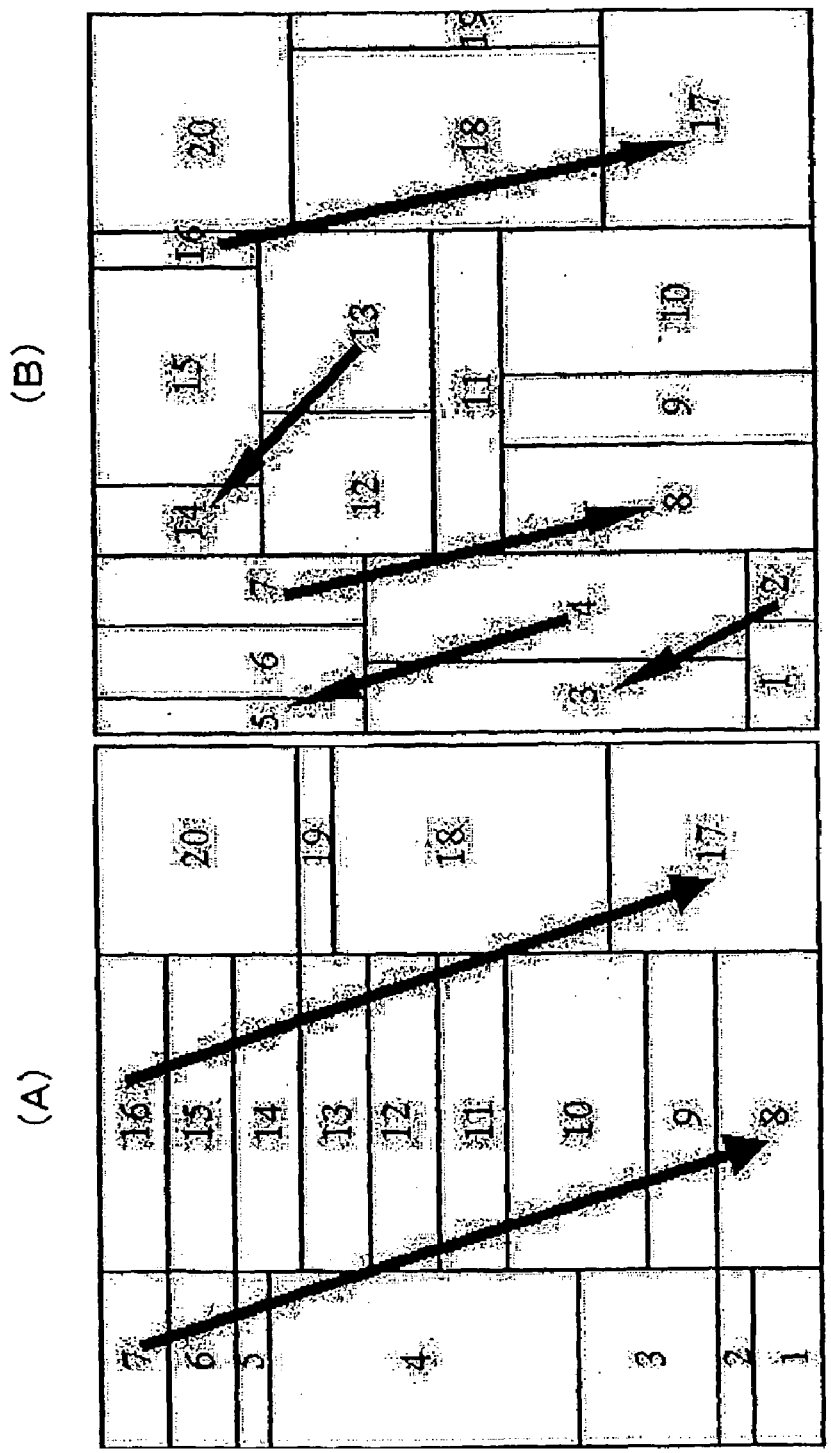
FIG. 13 shows examples of drawing in Treemap method.
Figure 14:
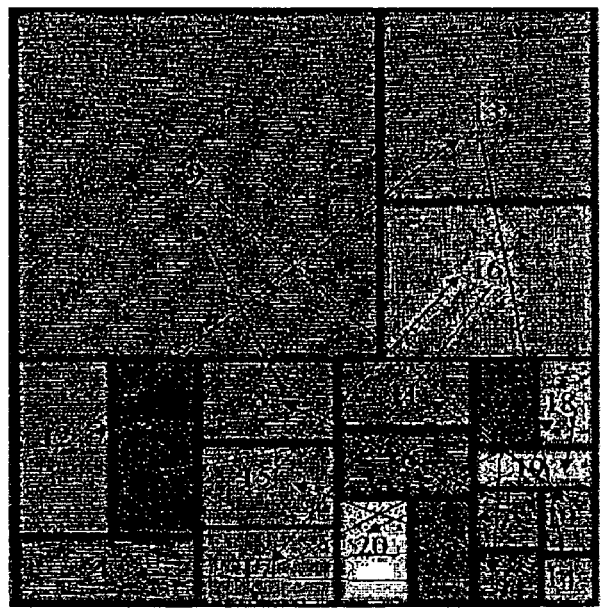
FIG. 14 shows an example of drawing in Squarified Treemap method.
Figure 15:
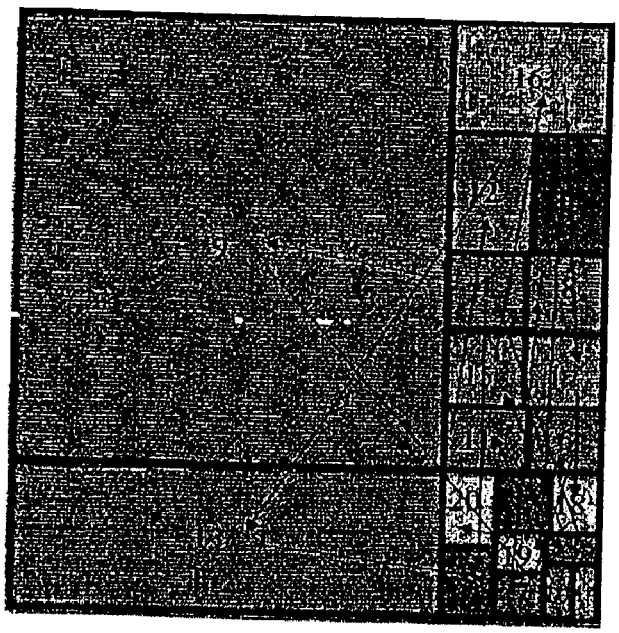
FIG. 15 shows an example of drawing in Clustered Treemap method.
Figure 16:
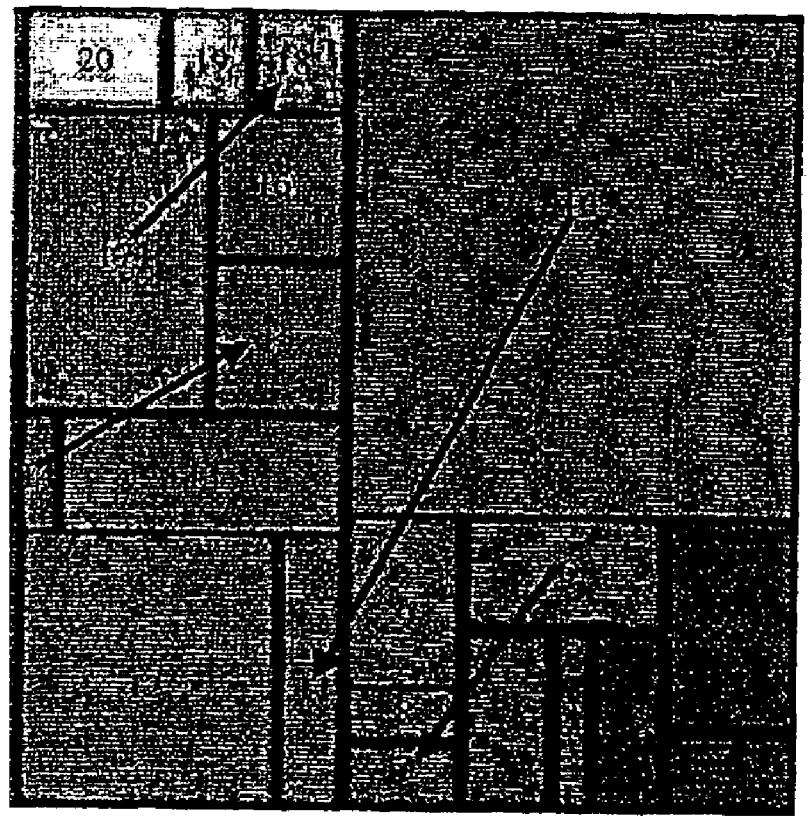
FIG. 16 shows an example of drawing in the Ordered Treemap method.

FIG. 11 shows an example of the graphics image generated with respect to similar statistical data as the examples shown in FIGS. 8 to 10, in conventional Ordered Treemap method. When FIG. 11 is compared with FIGS. 8 to 10, there are few classes having the aspect ratios of the extreme high values also in FIG. 11, and the visibility for each class itself is not inferior to that in FIGS. 8 to 10. However, since there are various directions vertically and horizontally in which the classes line up, the order of the section values of the classes is difficult to understand, thereby it may be seen that the example of FIG. 11 is not suitable for visualizing the statistical data in which the order of the section values becomes important. Furthermore, as described above, in the Ordered Treemap method, there may be the case where the classes adjacent in the order of the section values are arranged at the separate positions on the screen.

In addition, in the drawing according to the present embodiment as shown in FIGS. 8 to 10, in which the respective classes are arranged on a plurality of strip regions formed in the rectangular region corresponding to the entire statistical data, a form of the drawing may be flexibly selected by putting higher importance on the visibility for the small classes, or by putting higher importance on the easiness in the comparison of the large classes. Therefore, for example as shown in FIG. 9, though there is the case where the aspect ratio of the predetermined class becomes extreme high, the excellent drawing result may be obtained in which the aspect ratio of the class with higher importance particularly approximates to one (1). In addition, the drawing may also be performed such that the class having the aspect ratio of the extreme high value may not appear. On the other hand, in the drawing in the Ordered Treemap method, as shown in FIG. 11, since the rectangular region corresponding to the entire statistical data is arranged complexly, it is difficult to change the drawing form by putting higher importance on the class of a predetermined size.

As described above, according to the present invention, in a method of visualizing statistical data, it is possible to constantly provide drawing with excellent visibility by arranging rectangles corresponding to individual data in an order corresponding to section values of classes, and displaying a rectangle corresponding to a desired class value in a near square shape. In addition, according to the present invention, it is possible to draw the data for easy visual comparison by arranging the rectangles corresponding to the data adjacent in the section values necessarily in adjacent positional relation.

Variations described for the present invention can be realized in any combination desirable for each particular application. Thus particular limitations, and/or embodiment enhancements described herein, which may have particular advantages to the particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

We claim:

1. A graphics image generation method comprising controlling a computer to generate a graphics image for visualizing statistical data, comprising:

a first group of steps including reading from a memory the statistical data to be processed, forming a plurality of strip regions in a region corresponding to said entire statistical data and arranging rectangles for representing individual data of said statistical data in said strip regions, and storing in the memory image data of the region corresponding to said entire statistical data with said rectangles arranged therein; and a second group of steps including reading from said memory the image data of the region corresponding to said entire statistical data, and with respect to sequences of the rectangles in said image data, rearranging the rectangles in each of said strip regions such that the rectangles corresponding to said individual data adjacent to each other in said statistical data are also adjacent to each other in the image, and storing the image data in the memory;

wherein the step of arranging said rectangles comprises the steps of:

generating said rectangles having sizes with contents of the individual data in said statistical data reflected therein; and arranging said rectangles in the region corresponding to said entire statistical data, in an order determined based on one or more of: a line-up order or the sizes of said rectangles, and, the step of rearranging the shapes and the arrangements of said rectangles comprises a step of rearranging the shapes and the arrangements of said rectangles such that the aspect ratio of a predetermined rectangle is determined based on the sizes of said rectangles and approximates to one (1), and, assigning, by a user, a class value to a rectangle based on one or more criteria comprising: importance of statistical data being represented, or importance of viewing said data in said image file, wherein the aspect ratio of said rectangle is further adjusted accordingly for higher value class's aspect ratio to be made to approximate to one (1).

2. A graphics image generation method of controlling a computer to generate a graphics image for visualizing statistical data, comprising the steps of:

reading from a memory the statistical data to be processed, and arranging rectangles for representing individual data of said statistical data in a region corresponding to said entire statistical data, according to a line-up order of said statistical data;

rearranging shapes and the arrangements of the respective rectangles such that an aspect ratio of a predetermined rectangle among said arranged rectangles approximates to one (1) and sequences of said rectangles line up as strips, and storing in the memory image data of the region corresponding to said rearranged entire statistical data; and reading from said memory the image data of the region corresponding to said entire statistical data, and with respect to the sequences of the rectangles in said image data, making the respective rectangles contiguous in the order according to said statistical data by inverting a line-up order of said rectangles in each sequence; and, assigning, by a user, a class value to a rectangle based on one or more criteria comprising: importance of statistical data being represented, or importance of viewing said data in said image file, wherein the aspect ratio of said rectangle is further adjusted accordingly for higher value class's aspect ratio to be made to approximate to one (1).

3. A computer-readable medium tangibly embodying program instructions, executable by a machine, for controlling a computer to generate a graphics image for visualizing statistical data, making said computer execute:

a first process of reading from a memory the statistical data to be processed, forming a plurality of strip regions in a region corresponding to said entire statistical data and arranging rectangles for representing individual data of said statistical data in said strip regions, and storing in the memory image data of the region corresponding to said entire statistical data with said rectangles arranged therein; and a second process of reading from said memory the image data of the region corresponding to said entire statistical data, and with respect to sequences of the rectangles in said image data, rearranging the rectangles in each of said strip regions such that the rectangles corresponding to said individual data adjacent to each other in said statistical data are also adjacent to each other in the image, and storing the image data in the memory;

wherein the process of arranging said rectangles by said program comprises the processes of:

generating said rectangles having sizes with contents of the individual data in said statistical data reflected therein; and arranging said rectangles in the region corresponding to said entire statistical data, in one of: a descending or ascending order of the sizes of said rectangles, and, the step of rearranging the shapes and the arrangements of said rectangles by said program comprises a process of rearranging the shapes and the arrangements of said rectangles such that the aspect ratio of said rectangle having a large size among said plurality of adjacent rectangles approximates to one (1), and, assigning, by a user, a class value to a rectangle based on one or more criteria comprising: importance of statistical data being represented, or importance of viewing said data in said image file, wherein the aspect ratio of said rectangle is further adjusted accordingly for higher value class's aspect ratio to be made to approximate to one (1).

4. A computer-readable medium tangibly embodying program instructions, executable by a machine, for controlling a computer to generate a graphics image for visualizing statistical data, making said computer execute the processes of:

reading from a memory the statistical data to be processed, and arranging rectangles for representing individual data of said statistical data in a region corresponding to said entire statistical data, according to a line-up order of said statistical data; and rearranging shapes and the arrangements of the respective rectangles such that an aspect ratio of a predetermined rectangle among said arranged rectangles approximates to one (1) and sequences of said rectangles line up as strips, and storing in the memory image data of the region corresponding to said rearranged entire statistical data; and, assigning, by a user, a class value to a rectangle based on one or more criteria comprising: importance of statistical data being represented, or importance of viewing said data in said image file, wherein the aspect ratio of said rectangle is further adjusted accordingly for higher value class's aspect ratio to be made to approximate to one (1).

5. A statistical data drawing apparatus for controlling a computer to generate and draw a graphics image for visualizing statistical data, comprising:

storage means having stored the statistical data to be processed;

graphics image generation means for generating the graphics image constructed such that with respect to the statistical data to be processed, read from said storage means, a region corresponding to said entire statistical data is segmented into a plurality of strip regions, and that figures for representing individual data of said statistical data are arranged in said strip regions in which the figures corresponding to said individual data adjacent to each other in said statistical data are also adjacent to each other in said image; and output means for outputting the graphics image of said statistical data generated by said graphics image generation means;

wherein the process of arranging said rectangles by said program comprises the processes of: generating said rectangles having sizes with contents of the individual data in said statistical data reflected therein; and arranging said rectangles in the region corresponding to said entire statistical data, in one of: a descending or ascending order of the sizes of said rectangles, and the step of rearranging the shapes and the arrangements of said rectangles by said program comprises a process of rearranging the shapes and the arrangements of said rectangles such that the aspect ratio of said rectangle having a large size among said plurality of adjacent rectangles approximates to one (1), and assigning, by a user, a class value to a rectangle based on one or more criteria comprising: importance of statistical data being represented, or importance of viewing said data in said image file, wherein the aspect ratio of said rectangle is further adjusted accordingly for higher value class's aspect ratio to be made to approximate to one (1).

6. A statistical data drawing apparatus for controlling a computer to generate and draw a graphics image for visualizing statistical data, comprising:

- a class arranging section for arranging rectangles for representing individual data of said statistical data in a predetermined order, into a line-up order according to said statistical data, in a region corresponding to said entire statistical data;
- a rearrangement processing section for rearranging the arrangements and shapes of said rectangles such that with respect to a plurality of rectangles adjacent to each other, an aspect ratio of a predetermined rectangle approximates to one (1) and said plurality of rectangles line up as strips; rectangle among said arranged rectangles approximates to one (1) and sequences of said rectangles line up as strips, and storing in the memory image data of the region corresponding to said rearranged entire statistical data; and
- reading from said memory the image data of the region corresponding to said entire statistical data, and with respect to the sequences of the rectangles in said image data, making the respective rectangles contiguous in the order according to said statistical data by inverting a line-up order of said rectangles in each sequence, and, assigning, by a user, a class value to a rectangle based on one or more criteria comprising: importance of statistical data being represented, or importance of viewing said data in said image file, wherein the aspect ratio of said rectangle is further adjusted accordingly for higher value class's aspect ratio to be made to approximate to one (1).

* * * * *